United States Patent [19]

Burkam

[11] Patent Number: 4,759,514

[45] Date of Patent: Jul. 26, 1988

[54] TAIL ROTOR YAW POSITION CONTROL FOR A HELICOPTER

[75] Inventor: John E. Burkam, Media, Pa.

[73] Assignee: The Boeing Company, Seattle, Wash.

[21] Appl. No.: 913,275

[22] Filed: Sep. 30, 1986

[51] Int. Cl.$^4$ .............................................. B64C 27/82
[52] U.S. Cl. ............................... 244/17.21; 244/17.19; 416/43
[58] Field of Search ............... 244/17.11, 17.13, 17.19, 244/17.21; 416/31, 43

[56] References Cited

U.S. PATENT DOCUMENTS

| | | | |
|---|---|---|---|
| 2,491,191 | 12/1949 | Maillard et al. | 416/43 |
| 3,004,736 | 10/1961 | Culver et al. | |
| 3,211,235 | 10/1965 | Brett | 244/17.19 |
| 3,404,737 | 10/1968 | Keder, Jr. | |
| 3,528,633 | 9/1970 | Knemeyer | |
| 3,532,302 | 10/1970 | Dean | |

FOREIGN PATENT DOCUMENTS 1581060 9/1969 Fed. Rep. of Germany ... 244/17.19

Primary Examiner—Galen Barefoot
Assistant Examiner—Rodney Corl
Attorney, Agent, or Firm—Jones, Tullar & Cooper

[57] ABSTRACT

A yaw rate stabilizer for the tail rotor of a helicopter includes a tail rotor shaft rotatably supporting a tail rotor on which rotor blades are radially mounted to develop a lift force directed substantially horizontal and transverse to the longitudinal axis of the aircraft. A slider is provided connected by pitch links to the rotor. The angle of attack of the blades varies with the displacement of the slider relative to a rotor. The rotor shaft is mounted pivotably by a universal joint on the tail of the helicopter fuselage. A frame, pivotably aligned with the universal joint, is supported by a tension or compression spring and connected to a collective pitch transfer lever. The slider, which is slidably mounted on the rotor shaft, moves toward the tail rotor and increases the collective pitch of the blades as a result of the rotor pivoting at the universal joint to precession caused by a transient, yaw moment applied to the rotor by a transverse gust of wind. The blades develop increased lift directed opposite to the gust which opposes the yaw moment and stabilizes the aircraft.

17 Claims, 1 Drawing Sheet

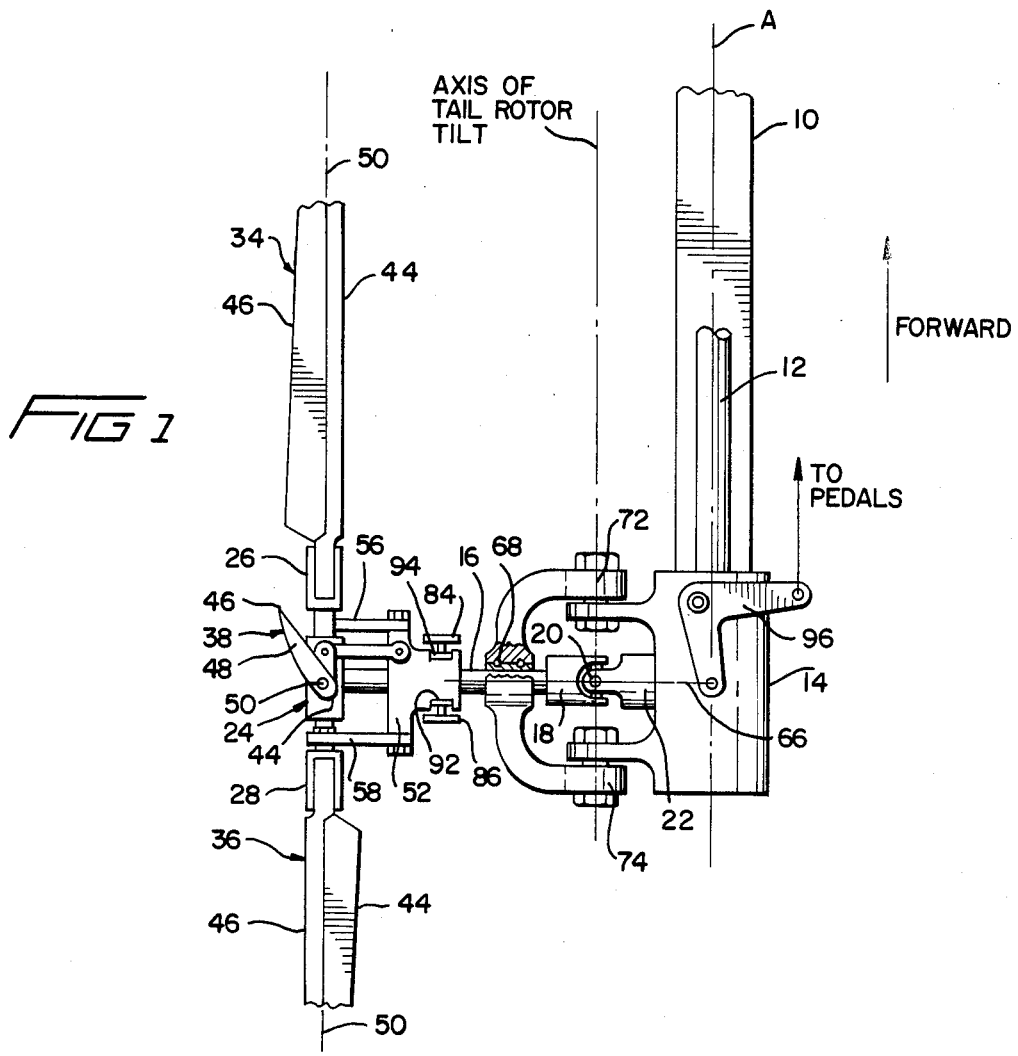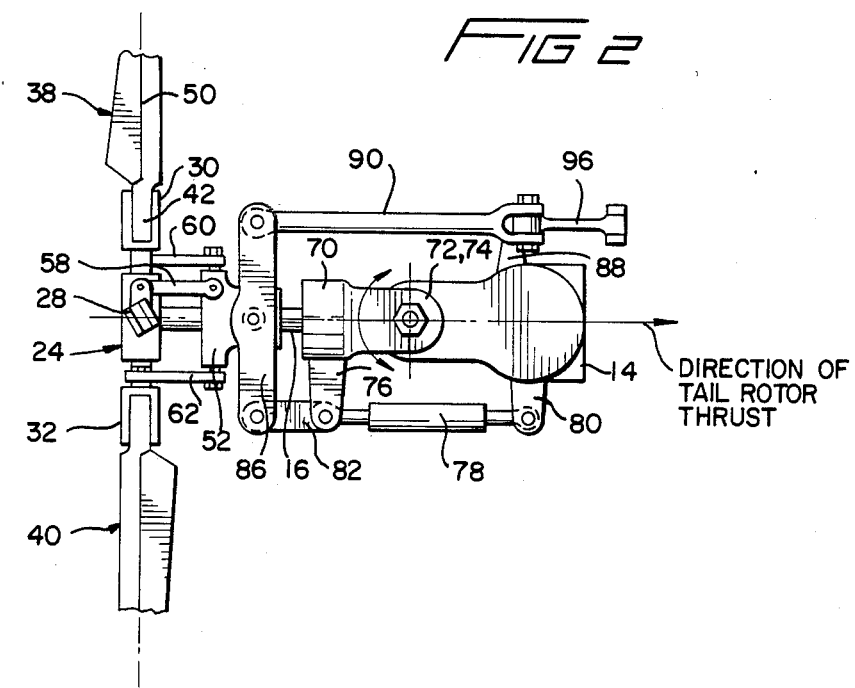

TAIL ROTOR YAW POSITION CONTROL FOR A HELICOPTER

FIELD OF THE INVENTION

This invention relates to the field of helicopter yaw control systems that employ tail rotor thrust to produce a stabilizing yaw moment on the fuselage.

More particularly, this invention relates to such control systems wherein the tail rotor thrust is changed in accordance with the precession that accompanies a destabilizing yaw moment applied to the aircraft, for example, by a transient lateral wind gust or inadvertent pilot control.

DESCRIPTION OF THE PRIOR ART

Conventionally helicopter tail rotors are controlled manually by the pilot who manipulates tail rotor pitch control pedals located in the cockpit. The pedals are connected by cables, bellcranks and push-pull rods to the collective pitch controls of the tail rotor blades. As the pedal position is changed, the angle of attack of the tail rotor blades and the thrust force they produce by rotating through the atmospheric air changes and produces a yaw moment about the center of gravity of the helicopter. This moment is directed opposite to the direction of the destabilizing yaw moment sensed by the pilot, who attempts to restore yaw position stability through operation of the tail rotor blade pitch pedals.

The helicopter during hover and when flight speed is low is particularly susceptible to wind gusts directed laterally with respect to the longitudinal axis of the aircraft. This susceptibility causes the need for frequent and precise yaw control corrective action by the pilot. An example of a tail rotor control system of this type is described in U.S. Pat. No. 3,211,235.

A related manual tail rotor control system having the ability to rotate from the conventional lateral thrust direction to a forward thrust direction is described in U.S. Pat. No. 3,404,737.

Various attempts have been made to relieve the pilot of the effort required to operate control pedals to maintain yaw position stability. For example, an electronic control system has been developed to automate yaw control against the effects of externally induced disturbances and to permit the pilot control over yaw position required to maneuver the aircraft. A system of this type, described in U.S. Pat. No. 3,528,633, senses the force applied by the pilot to the manual yaw control. An electronic control signal, proportional to the difference between the manual force and the yaw rate, is applied to a yaw servo system to maintain a yaw rate proportional to the manually applied force. After the manual force is removed from the controls, a control signal proportional to the sum of the yaw rate and the time integral of the yaw rate is applied to the yaw servo to preserve the yaw attitude the aircraft had when the manual force was removed.

Because the cables and push-pull control rods that establish the tail rotor pitch for yaw control are vulnerable to gunfire, and because their damage or loss is likely to result in failure to control the aircraft, military helicopters have redundant control linkage systems that produce identical tail rotor control in the event one of the systems fails to operate. U.S. Pat. No. 3,532,302 describes the use of a spring loaded actuator, which controls tail rotor pitch adequately for a return flight to base for repair if the primary control linkage system fails.

Another technique for automating yaw control, described in U.S. Pat. No. 3,004,736 includes a gyroscopic mechanism in the form of weighted arms extending radially from and fixed to a rotating shaft. Movement of the gyroscopic mechanism causes the rotating shaft to move in the same direction and moves a plate attached to the edge of the tail rotor blades. This movement of the shaft changes the pitch of the rotor blades and moves the tail rotor opposite to the direction that the shaft and gyroscopic mechanism moved to cause the pitch change.

SUMMARY OF THE INVENTION

It is an object of this invention to provide a tail rotor yaw position control for a helicopter which will maintain stable yaw directional control automatically and without continuous pilot manual control.

It is another object of this invention to provide a tail rotor yaw control which automatically corrects the yaw attitude of a helicopter following a transient load that rotates the aircraft about a yaw axis.

It is a further object of this invention to provide a tail rotor yaw control system that operates on the basis of movement caused by precession of the tail rotor resulting from a destabilizing yaw moment applied to the aircraft.

The control system of the present invention is mounted near the end of the tail cone portion of the fuselage and requires no control linkages or cables connecting the rotor and the foot pedals used by the pilot for flight maneuver yaw control. Instead, the system according to this invention includes a laterally directed tail rotor shaft extending outward from a tail rotor gearbox that is fixed to the fuselage. A tail rotor is fixed to the outer end of the shaft and supports multiple rotor blades extending radially outward from the axis of the shaft and angularly spaced from one another about the shaft axis. The blades develop aerodynamic lift forces as they rotate and the pitch of the blades is varied because each is mounted on the rotor for rotation about a radially directed pitch axis. The magnitude of the lift or tail rotor thrust varies with the pitch and is directed laterally. The thrust produces a yaw moment on the helicopter, which is supported vertically at the main rotor located a fixed distance along the longitudinal axis of the aircraft from the main rotor.

A slider located between the tail rotor and the gearbox is movable with respect to the rotor and is connected to the root of each rotor blade by a pitch link. The connection of each pitch link to its blade is made eccentric of the pitch axis of the blade so that any force carried by the pitch link between the blade and slider cause the blade to rotate about its pitch axis and the angles of attack of the blade to change.

The inboard end of the tail rotor shaft is fitted with a universal joint which defines a point about which the rotor, shaft, rotor blades and pitch links are free to rotate. However, the position of the slider is fixed relative to the pivot by a collective pitch transfer lever connected to the fuselage by means of attachments to the gearbox. A spring capsule may be used as part of the pitch transfer lever to join the lever partially resiliently to the gearbox in order to react precession forces. Alternatively the collective pitch transfer lever is fixed without a resilient connection to the gearbox.

When the tail cone rotates about the main rotor due to a lateral wind gust or other yaw destabilizing phenomenon, the tail rotor precesses about the pivot point in the direction that corresponds to the direction of the yaw moment. This rotation about the pivot point tends to move the rotor relative to the slider, whose position is fixed. However, because the pitch links maintain the relative position of the blade root and slider, the tail rotor precession causes the pitch links to increase the angle about the pitch axis of each rotor blade as it rotates perpendicular to the longitudinal axis of the helicopter. The increased rotor blade pitch increases the rotor thrust in the direction that produces a restoring yaw moment about the main rotor shaft.

The advantage of this invention in automatically making rotor blade pitch angle changes without manual control of the pilot is realized without hydraulics or electric actuation and without any control linkages specifically dedicated to producing yaw stability. The system simply and efficiently accommodates pilot manual control of the tail rotor pitch required for flight maneuvers by connecting the manually operated controls to the slider. In this way, its position relative to the rotor is established in accordance with the tail rotor thrust required to produce the maneuver.

BRIEF DESCRIPTION OF THE DRAWINGS

FIG. 1 is a top view of a helicopter tail rotor taken at discontinuous plane I—I of FIG. 2 partially in cross section showing the rotor in position on the adjacent fuselage structure and the yaw control of the present invention.

FIG. 2 is a view looking forward toward the main rotor from the rear of a helicopter tail rotor assembly.

DESCRIPTION OF THE PREFERRED EMBODIMENT

Referring first to FIG. 1, the tail rotor of a single rotor helicopter is supported near the end of the rear portion, called the tail cone 10, of a fuselage, which extends rearward from the cabin section. The tail cone supports a tail rotor drive shaft 12 that transmits power along the longitudinal axis A of the helicopter rearward from the engines to a tail rotor gearbox 14, which drives a tail rotor shaft 16 directed laterally and substantially perpendicular to the longitudinal axis of the aircraft. The tail rotor gearbox is fixed to the tail cone against relative displacement and rotation.

The tail rotor shaft is supported for rotation about its axis and is fixed to the gearbox against relative displacement in any direction. Located near the inboard end of the tail rotor shaft is a universal joint 18, which defines a pivot center 20 about which the rotor shaft can pivot in any direction. The inboard component 22 of the universal joint is supported rotatably within the gearbox so that relative displacement between the gearbox and rotor shaft is prevented.

A tail rotor 24, fixed to the outboard end of the rotor shaft, includes rotor arms 26, 28, 30, 32 that extend radially outward from the rotor shaft and are angularly spaced from one another about the axis of the rotor shaft. Each rotor arm is adapted to have connected to it a rotor blade 34, 36, 38 and 40 that extends radially outward from the tail rotor shaft axis.

The rotor blades are formed with an airfoil cross section that extends spanwise substantially the full length of each blade from its root end attachment 42 at the rotor arm to its radially outermost tip. The airfoil shape is seen best when viewed radially as is rotor blade 38 in FIG. 1. Each rotor blade has a leading edge 44, a trailing edge 46 and airfoil contour extending chordwise between the leading edge and trailing edge. The tail rotor assembly illustrated in the figures turns clockwise when viewing FIG. 1 from the left. Therefore rotor blade 38, which in FIG. 1 is shown extending upward from the tail rotor, rotates from that position rearward toward the position of rotor blade 36. The ambient air has relative velocity with respect to each rotor blade such that air flows over the airfoil from the leading edge to the trailing edge. A straight line extending from the leading edge to the trailing edge defines a chordal axis 48 for each blade, which axis generally is inclined with respect to the direction of the air flow. The acute angle between the chordal axis and the air flow direction is called the angle of attack or pitch angle of the blade.

Each rotor arm and the rotor blade attached to it is mounted on the tail rotor 24 so that the angular diposition of the chordal axis can vary about the pitch axis 50 with respect to the air flow direction. As the rotor blades rotate through the air they develop pressures on the airfoil contours whose corresponding forces, called lift, tend to move the rotor in the direction of the longitudinal axis of the tail rotor shaft. With the rotor blades having the angle of attack illustrated in FIG. 1, the resulting thrust or lift produced on the rotor blades is located substantially at the rotor center and is directed toward the tail rotor box. This lift force produces a counterclockwise torque, when viewing the helicopter downward from above the rotor, tending to rotate the fuselage in the direction that opposes the torque applied to the fuselage by the main rotor of the helicopter. The resulting torque balance maintains the attitude of the fuselage in alignment with the direction of flight or the required direction when the aircraft is maneuvering. If the angle of attack increases, the magnitude of the pressure forces developed on the airfoil increases and the resulting magnitude of the torque applied to the fuselage by the tail rotor increases.

Each rotor arm is connected by a pitch link to a slider 52, which is mounted coaxially with the tail rotor shaft 16 for displacement along the axis of the shaft and for rotation with the shaft. Each pitch link is connected to its corresponding rotor arm eccentric of, and on the trailing edge side of, the pitch axis of the associated rotor arm. For example, pitch link 56 connects with arm 26 to the slider, pitch link 58 makes the connection at pitch arm 28, pitch link 60 at pitch arm 30, and pitch link 62 at pitch arm 32. If the rotor moves by pivoting about center 20 toward the slider, the pitch links rotate the respective pitch arms counterclockwise, when they are viewed from the blade tip to its root. This movement of the rotor increases the angle of attack, the tail rotor lift, and yaw moment about the main rotor axis. The concurrent change in angle of attack of all the tail rotor blades produced in this way is called a change in collective pitch.

Referring to FIGS. 1 and 2, the tail rotor shaft is supported on bearings 68 carried on a frame 70, which is supported on the gearbox at two pivots 72, 74 aligned with center 20 of universal joint 18. Frame 70 has an arm 76, which extends downward from the axis of rotor shaft 16 and provides a mechanical attachment point where the outer end of a spring capsule 78 is connected. The opposite end of the capsule is connected to the end of an arm 80 formed on the gearbox housing. The spring capsule contains a tension or compression spring, which balances the precession force of the tail rotor to precess or tilt about the pivot center 20. A link 82, connected to the attachment where spring capsule 78 and arm 76 are joined, extends outward therefrom to a connection to the arms 84, 86 of a collective pitch transfer lever.

An arm 88 extending from the top surface of the gearbox provides an attachment point for the end of a strut 90, which is connected at its opposite end to the upper end of arms 84, 86 of the collective pitch lever. Strut 90 is pinned to arms 84, 86 to permit rotation of the arms with respect to the strut, but the strut is prevented from rotating with the arms in a vertical plane by its connection to the gearbox. However, the spring capsule 78, and link 82 can rotate about the pinned connection at the inboard end of the capsule to the gearbox as the rotor pivots about point 20 and frame 70 pivots on its pivots 72, 74.

Slider 52 defines annular recesses 92 on its outer surface at its inboard end, into which recesses are fitted pins 94 located on the adjacent surfaces of arms 84, 86.

Precession is an effect manifested by a rotating body when torque is applied to it tending to change the direction of its axis of rotation. If the speed of rotation and the applied torque are constant, the axis slowly describes a cone whose motion is perpendicular to the direction of the torque. If the rotating body is symmetrical and its motion unconstrained, and if the torque on the spin axis is at right angles to that axis, the axis of precession will be perpendicular to both the spin axis and the torque axis. Under these circumstances the precession moment or torque is equal to $I \cdot \omega_1 \cdot \omega_2$, where I is the polar moment of inertia of the body, $\omega_1$ is the rotational velocity about an axis perpendicular to the spin axis (the yaw velocity), and $\omega_2$ is the spinning rotational velocity of the body. The body precesses or tilts in the direction that aligns the direction of rotation of the rotor with the direction of rotation of the applied torque.

Applying this to FIGS. 1 and 2 with the tail rotor blade rotating top side aft and bottom side forward, a gust from the right side of the tail cone 10 causes the fuselage to yaw clockwise about the main rotor axis when viewed from above as in FIG. 1. The tail rotor, which is itself a yaw rate gyro according to the present invention, responds by tilting clockwise when viewing the tail rotor from the rear as in FIG. 2. This direction of precession aligns the direction of the tail rotor rotation with the clockwise moment applied to the aircraft by the gust. Accordingly, the tail rotor blade 38 in the straight up position tilts toward the gearbox and the blade diametrically opposite tilts away from the gearbox. The tail rotor pivots about pivot center 20 due to precession effects, yet strut 90 holds arms 84 and 86 of the collective pitch transfer lever fixed in the position they had before precession. Arms 84, 86 hold slider 52 fixed relative to the tail rotor at the topside blade position, but the rotor pivoting about pivot point 20 causes the slider to slider relative to the rotor. The effect of the relative motion between the slider and tail rotor is to force the pitch link that is attached to the topside blade to rotate the blade about its pitch axis and to increase its pitch angle. This action increases the thrust of the tail rotor toward the gearbox and increases the counterclockwise yaw moment produced by tail rotor thrust about the main rotor axis. The increased tail rotor yaw moment opposes the yaw moment caused by the gust.

At the bottom side of the tail rotor, the collective pitch transfer lever arms 84 and 86 rotate about the upper pin connection to strut 90, spring capsule 78 expands and allows the rotor to tilt away from the gearbox about pivot point 20.

In the operation of conventional tail rotor control systems, the pilot, through manual operation of pedals located in the cockpit, causes a bellcrank 96 to rotate on its pivot, which is mounted on the tail rotor gearbox. One arm of the bellcrank is actuated by the pilot, the other arm is connected by member 66 to slider 52. If the magnitude of the tail rotor stabilizing yaw moment is to increase, bellcrank 96 is rotated clockwise when viewed from above. Counterclockwise rotation causes the slider to move away from the tail rotor, lowers the collective pitch and decreases the torque. The operation of the yaw rate stabilizer according to this invention depends on the maintaining of the position of the bellcrank unchanged when the tail rotor tilts due to precession. Otherwise, if the manual system for controlling the operation of the bellcrank changed the position of the bellcrank and slider and did not accommodate the change in collective pitch as determined by operation of the yaw rate stabilizer, the manual system would counteract the effect of the automatic yaw stabilizer of this invention. Therefore, the manually operated control system does not move when the automatic yaw stabilizer alters the pitch angle of the tail rotor blades.

What is claimed is:

1. A yaw rate control for stabilizing yaw movement of a helicopter about its main rotor axis comprising:
    a tail rotor supported rotatably about a first axis that is spaced from the main rotor axis, adapted to have a plurality of rotor arms each including a rotor blade mounted thereon, each rotor arm extending radially outward from the first axis along respective pitch axes, the collective pitch of the rotor blades being variable;
    means for pivotably supporting the tail rotor about a pivot axis substantially perpendicular to the first axis;
    means, whose distance from the tail rotor changes as the tail rotor pivots about the pivot axis, for varying the pitch angle of the rotor blades in accordance with the change in said distance; and
    means for holding the position of the pitch varying means, wherein the change in pitch angle produces a change in tail rotor thrust tending to decrease the tail rotor pivoting about the pivot axis.

2. The yaw rate control of claim 1 wherein the tail rotor includes:
    a rotor shaft extending laterally and substantially perpendicular to the longitudinal axis of the helicopter;
    a rotor hub fixed to the rotor shaft; and
    multiple rotor arms spaced angularly about the first axis, mounted on the rotor hub for rotation about its respective pitch axis and adapted to have a rotor blade attached thereto.

3. The yaw rate control of claim 2 wherein the tail rotor further includes pitch links, one connected to each rotor arm, the connections being located eccentric of the respective pitch axis, whereby movement of the pitch link connection relative to the rotor hub changes the pitch angle of the rotor arm.

4. The yaw rate control of claim 3 wherein each rotor arm has a leading edge and trailing edge located on diametrically opposite lateral sides of the respective pitch axes and the connection of each pitch link to the respective rotor arm is located on the trailing edge side of the pitch axis.

5. The yaw rate control of claim 3 wherein the rotor blades have a leading edge, a trailing edge and an airfoil contour on which a lift force is developed, and the rotor blades are attached to the rotor arms so that the trailing edge of the blade is located on the lateral side of the pitch axis where the pitch link is connected to the rotor arm, and the airfoil contour is disposed so that the lift force is directed toward the pivot axis.

6. The yaw rate control of claim 1 wherein the pivotable supporting means includes:
 a rotor shaft extending laterally and substantially perpendicular to the longitudinal axis of the helicopter, having the tail rotor fixed thereto;
 a pivot support spaced along the axis of the rotor shaft from the tail rotor defining a pivot axis about which the rotor shaft and tail rotor can pivot.

7. The yaw rate control of claim 6 wherein the pivot axis is substantially aligned with the longitudinal axis of the helicopter.

8. The yaw rate control of claim 6 wherein the pivot support includes a universal joint that defines a pivot point about which the rotor shaft and tail rotor can pivot about any axis passing through the pivot point.

9. The yaw rate control of claim 6 further including a gearbox and wherein the pivot support is drivably connected at its inboard end to the gearbox output and at its outboard end to the rotor shaft.

10. The yaw rate control of claim 3 wherein the pitch varying means includes a slider spaced along the first axis from the tail rotor, said slider being mounted for rotation with the tail rotor about the first axis, said pitch varying means permitting movement of the slider relative to the tail rotor as the tail rotor pivots about the pivot axis.

11. The yaw rate control of claim 10 wherein the slider permits pivoting movement of the tail rotor about the pivot axis.

12. The yaw rate control of claim 11 wherein the slider is mounted to move axially as the tail rotor pivots about the pivot axis, the pitch links maintain the distance between the location of the connection of the pitch links to the rotor arms and the location of the connection of the pitch links to the slider, whereby the pitch angle of the rotor blades changes in accordance with the movement of the tail rotor relative to the slider.

13. The yaw rate control of claim 1 further including:
 pitch links, one connected to each rotor arm, the connections being located eccentric of the respective pitch axis;
 a slider spaced along the first axis from the tail rotor, mounted for rotation with the tail rotor about the first axis, said slider being mounted to move axially as the tail rotor pivots about the pivot axis, and wherein the holding means includes means immovable with respect to the tail rotor for fixing the position of the slider.

14. The yaw rate control of claim 13 wherein the fixing means includes:
 a pivot support; and
 a lever arm pivotably mounted at the pivot support slidably connected to the slider, defining the location of a connection to the slider with respect to the pivot support.

15. The yaw rate control of claim 14 further comprising spring means connected to the lever arm for resiliently restricting the pivotal movement of the lever arm and the slider about the pivot support.

16. The yaw rate control of claim 14 further comprising a frame pivotably mounted on the pivot axis;
 a link connecting the lever arm to the frame;
 spring means connected to the frame for resiliently restricting the pivotal movement of the arm and slider about the pivot support; and
 a strut having one end fixed to the helicopter fuselage against rotation about an axis parallel to the pivot axis and a second end connected to the lever arm permitting rotation of the lever on the pivot support substantially parallel to the pivot axis.

17. The yaw rate control of claim 1 further comprising:
 a bellcrank pivotably mounted on the helicopter fuselage having a first arm movable in accordance with manual control input required for flight maneuvers;
 movable connecting means for transmitting movement of the manual control input from the bellcrank to the pitch varying means.

* * * * *